Dec. 16, 1941.                J. W. HALE                2,266,598
              CONTROL SYSTEM FOR CHANGE-SPEED DEVICES
                        Filed Feb. 15, 1939

INVENTOR:
Jesse W. Hale
BY Spear, Rawlings & Spear
ATTORNEYS.

Patented Dec. 16, 1941

2,266,598

UNITED STATES PATENT OFFICE 2,266,598

CONTROL SYSTEM FOR CHANGE-SPEED DEVICES

Jesse W. Hale, Newton, Mass.

Application February 15, 1939, Serial No. 256,551

8 Claims. (Cl. 74—336.5)

My present invention relates to novel change speed mechanism.

While change speed devices have in recent years merited considerable attention, most of the structures developed have a common objectionable feature in that special transmissions are required. This objection is not directed to the merits of such special transmissions, but to the fact that the present transmissions, manually controlled by the operator, are acceptable and the manufacturer may desire to give the purchaser an option as to whether or not he desires automatic control of gear ratio changes. For that reason, my present invention is directed to a simple and efficient basis whereby conventional manually controlled transmissions may be readily converted to afford to the operator the advantages inherent in automatic or other more convenient means of control of the ratio changes.

In the accompanying drawing, I have illustrated my invention to show its general construction to permit its full nature and advantages to be readily appreciated. In the drawing.

Figure 1:
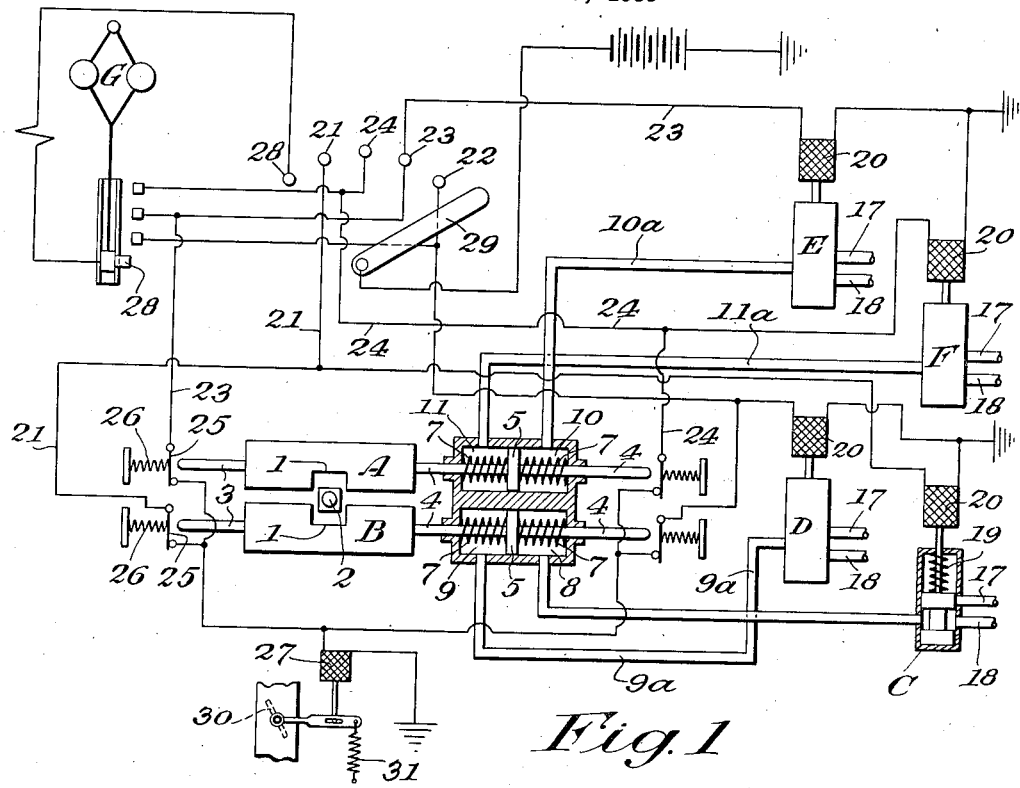
Fig. 1 is a schematic view of my invention as utilized with a conventional transmission of which only slidable selectors are shown.

Because my invention may be utilized with any conventional transmission, I have shown in Fig. 1 only the selectors A and B as indicative of such transmissions. It will be understood that predetermined movements of the selectors cause the mesh of desired gears to establish reverse and forward speeds.

In accordance with my invention I utilize novel means to actuate the selectors to effect gear ratio changes, but preserve their conventional function in the event of failure of the power. For example, in Fig. 1, I have shown the selectors A and B as recessed as at 1 to receive a lever or like manually operable control as indicated as at 2.

In accordance with my invention, I utilize power means to actuate the selectors. For power, I prefer fluid under pressure available from the conventional engine lubricating system that ensures an adequate supply of oil under pressure suitable for effecting desired movements of the selectors.

In the embodiment of my invention shown in Fig. 1, each of the selectors A and B include at each end portions 3 and 4 with each of the portions 4 carrying a disc 5 within a casing 6 and balanced by springs 7 to establish cylinders 8, 9, 10, and 11. The cylinders 8, 9, 10, and 11 are the reverse, low speed, intermediate or second speed, and high speed cylinders respectively.

Figure 2:
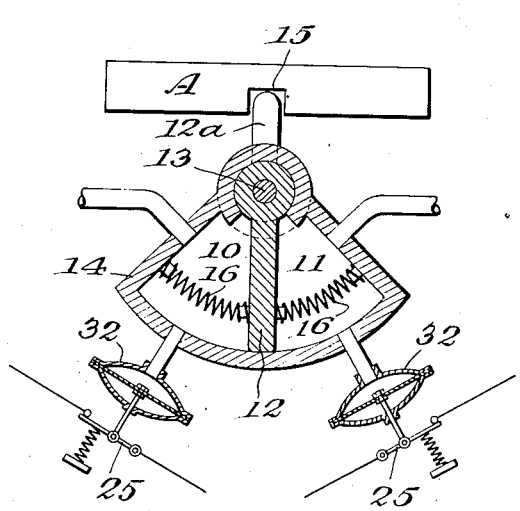
Fig. 2 shows a modification of my invention.

In the embodiment of my invention shown in Fig. 2, I have shown only the two cylinders 10 and 11 for convenience. A radial piston 12 is pivotally mounted as at 13 within a sector shaped casing 14 and the piston 12 includes a lever 12ª extending into the recess 15 in the selector A. Springs 16 normally maintain the piston 12 in a neutral position and establish the cylinders 10 and 11.

I have not shown the source of fluid pressure but have indicated as at 17 conduits in communication with the source and the solenoid operated valves C, D, E, and F adapted to connect the conduits 17 with the conduits 8ª, 9, 10ª, and 11ª in communication with the cylinders 8, 9, 10, and 11 respectively or the conduits 8ª, 9ª, 10ª, and 11ª to the relief conduits 18. Each of the valves is identical and includes a spring 19 normally positioning the valve so that pressure in the cylinder may be relieved. A solenoid 20 when energized is adapted to position the valve so that fluid under pressure is admitted to the cylinder to effect a gear ratio change.

Separate circuits for each of the solenoid operated valves C, D, E, and F are indicated at 21, 22, 23, and 24 respectively. Each of the circuits includes a solenoid 20, a switch 25 normally closed by the spring 26 and in series with the switch 25 a solenoid 27 common to each of the circuits 21, 22, 23, and 24.

At G, I have indicated a governor responsive to the speed of the vehicle. The governor G carries the contact 28 and acts to close the circuits 22, 23, and 24 successively at predetermined speeds. If desired, the governor G may be dominated to render its automatic operation flexible. At 29 I have shown a switch adapted to close the circuit 21 (controlling the reverse position) and to open the circuit to the contact 28. The switch may also be employed as a manually operable circuit selector.

The solenoid 27 is adapted to effect a suitable suspension of the transmission of power to permit the shift to be made. The solenoid 27, may, therefore, control the ignition, the throttle, or power controlled clutch operating mechanism. I have shown the solenoid 27 as operating a valve 30 normally held open by a spring 31.

As only one circuit is closed at a time, the power from the engine may be restored by breaking that circuit after the shift has been completed. As shown in Fig. 1, this may be effected by the portions 3 and 4 of the selector A and B that at each extreme position of the selectors may open a switch 25 against the action of its spring 26. This result may be accomplished in other ways, as for example, by the use of diaphragms or like pressure operable members 32 for each of the cylinders as shown in Fig. 2 so that as the pressure increase at the end of the movement of the selector, the increase in pressure results in an opening of the switch 25.

In operation, each circuit is separately and successively energized. When energized, its valve is opened to deliver fluid under pressure to cause a desired movement of the selector and the power is suspended as above indicated. Immediately on the completion of the shift, the limit switches 25 are opened to restore the power from the prime mover so that in accordance with my invention gear ratio changes may be readily effected. Because each circuit is separately energized, means must be employed, when a governor is used to close the circuits, to hold a valve in open position until a circuit for another valve is closed. In my co-pending application, Serial No. 215,657, filed June 24, 1938, I have shown a selector that may be used in my present invention.

Figure 3:
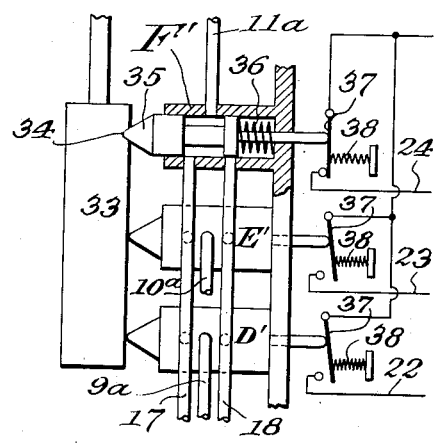
Fig. 3 shows another modification of my invention.

An alternative method of accomplishing the same result is shown in Fig. 3. The governor (not shown) actuates a slide 33 notched as at 34. Valves $D^1$, $E^1$, and $F^1$ connect to the cylinder for low, intermediate and high speeds. Each of the valves $D^1$, $E^1$, and $F^1$ include a pointed head 35 adapted to engage with the notch 34 in predetermined order as the governor actuates the slide 33. Springs 36 urge the heads 35 of the valves into the notch 34 effecting a detent action which must be overcome before successive governor movement is established, thereby ensuring the maintenance of one circuit until another circuit is to be energized. When a spring 36 moves a valve as above stated, the switch 37 for that valve is closed against the action of the spring 38 energizing the solenoid 27 for the valve 30 and when the selector or shifter bar completes its movement the circuit is opened as above described so that the valve 30 is opened by the spring 31 restoring the effective power.

What I therefore claim and desire to secure by Letters Patent is:

1. In a ratio change mechanism having a drive shaft, a driven shaft, a plurality of slidable members effecting ratio changes between said shafts on predetermined movements, means to slide said members including a plurality of cylinders, a piston in each cylinder, means to deliver fluid under pressure; to operate each of said pistons, a power control including means operable to reduce the effective power of said drive shaft, and pressure operated means to restore said effective power when a predetermined movement of one of said slidable members has been completed, and means opposing said pistons to position said slidable members in a neutral position to render said ratio effecting means inoperative.

2. In a ratio change mechanism having a drive member, a driven member, ratio changing means connecting said member, a movable member effecting ratio changes between said drive and driven members on predetermined movements, hydraulically operable means including a source of fluid under constant pressure to effect said predetermined movements, means adapted to control said drive member to permit a ratio change to be effected, means to control said hydraulically operable means and to actuate said control means for said drive member, and pressure operable means operable at predetermined pressure in excess of that essential to effect movement of said movable member to render said control means for said drive member inoperative.

3. The device of claim 2 in which the hydraulically operable means comprise a sector shaped casing having a pair of spaced ports, a radial piston pivotally mounted in said casing and including a lever portion, said movable member being formed to receive said lever portion, resilient means to position said piston intermediate said ports, and the pressure operable means include a device responsive to a predetermined pressure intermediate each of said ports and said piston.

4. The device of claim 2 in which the hydraulically operable means comprise a casing having a pair of spaced ports, a piston member within said casing carried by said movable member, and means within said casing to normally position said piston intermediate said ports, and the pressure operable means include a device responsive to a predetermined pressure intermediate each of said ports and said piston member.

5. In a ratio change mechanism having a drive member, a driven member, and means connecting said members at different ratios, a pressure operable control for said connecting means, a second control to vary the effective power on said drive member, and means to render said last named control inoperative when said first named means have effected a ratio change, and said last named means including a pressure operated control responsive to pressures in excess of that required to actuate said pressure operable control.

6. Shifter mechanism for a ratio changer connecting a drive member and driven member, said mechanism including a shifter bar having a neutral position and at least two operative positions wherein predetermined ratios between said members are established, means in control of said shifter bar normally maintaining it in said neutral position, power operable means to actuate said bar into either operative position, a pair of valves in control of said power operable means whereby the desired ratio may be selected, an electrically operated device to actuate each of said valves, an electrically operated auxiliary control effective to control said drive member to facilitate ratio changes, said auxiliary control including a pair of normally closed parallel switches, and an electric circuit for each ratio change, each of said circuits including in parallel one of said electrically operated devices and one of said normally closed switches, each of said normally closed switches being disposed to be opened by said bar when its movement into the operative position determined by the electrically operated device in circuit therewith has been completed.

7. The mechanism of claim 6 in which a speed responsive circuit closer is in control of said circuits.

8. Shifting mechanism for a ratio changer connecting a drive member and a driven member, said mechanism including a shifter bar having a neutral position and at least two operative positions wherein predetermined ratios between said members are established, means in control of said shifter bar normally maintaining it in said neutral position, power operable means to actuate said bar into said operative position including a normally closed valve for each operative position, means to open said valves separately and successively, an electrically operated auxiliary control effective to control said drive member to facilitate ratio changes, said auxiliary control including a circuit for each operative position of said shifter bar, each of said circuits including a normally open switch and a normally closed switch in series, means operative to close said normally open switch when one of said valves is opened and said normally closed switch being opened by said shifter bar when said shifter bar has moved into the operative position determined by said valve.

JESSE W. HALE.